April 26, 1966    J. M. CHILTON    3,247,915
WEIGHING APPARATUS WITH DIGITAL WEIGHT INDICATOR OR RECORDER
CONTROLLED BY STABLE CONDITION RESPONSIVE MEANS
Filed May 7, 1965    2 Sheets-Sheet 2
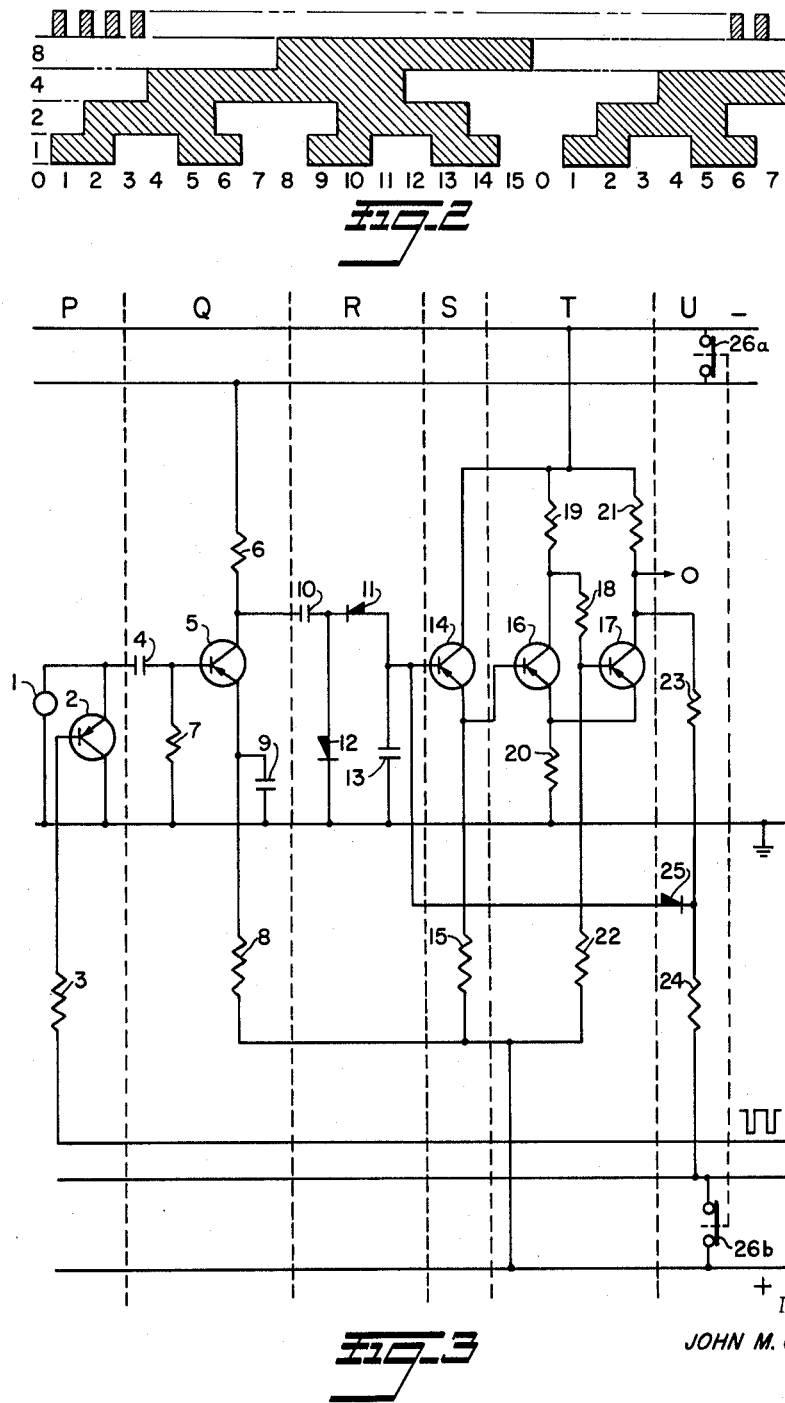
INVENTOR
JOHN M. CHILTON
BY
Norris & Bateman
ATTORNEYS

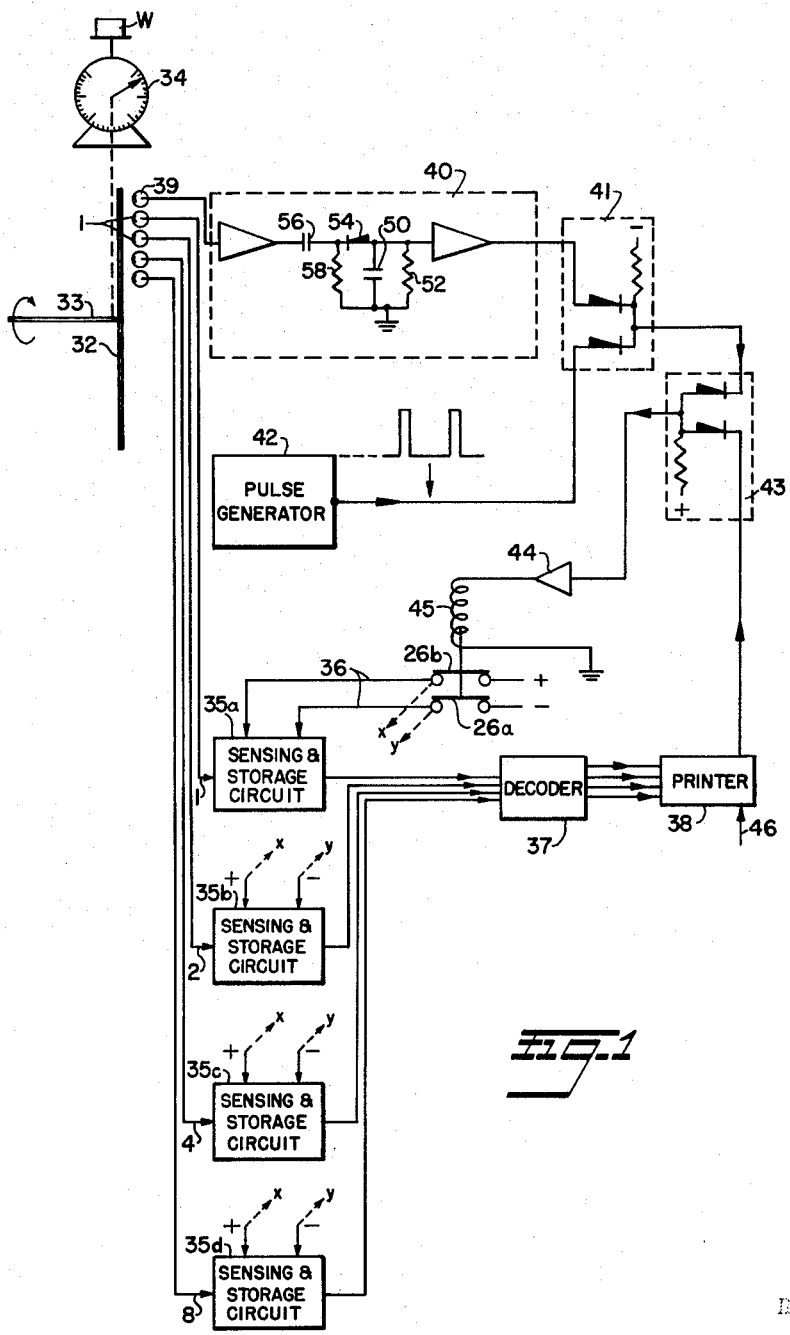

United States Patent Office 3,247,915
Patented Apr. 26, 1966

3,247,915
WEIGHING APPARATUS WITH DIGITAL WEIGHT INDICATOR OR RECORDER CONTROLLED BY STABLE CONDITION RESPONSIVE MEANS
John Moorhouse Chilton, 276 Court Oak Road, Harborne, Birmingham 32, England
Filed May 7, 1965, Ser. No. 453,932
Claims priority, application Great Britain, Jan. 11, 1962, 1,032/62
12 Claims. (Cl. 177—12)

This application is a continuation-in-part of my abandoned copending application Serial No. 250,257 filed January 9, 1963.

This invention relates to weighing apparatus employing electrically operated digital weight indication and/or recording.

In apparatus of the foregoing type, difficulty can arise after the weighing mechanism has achieved a state of equilibrium at which time an electrical signal indicative of the weighment to be indicated and/or recorded is provided, as a result of vibrations which cause a change in value indicated by the electrical signal. Because of the changing electrical signal, visual recognition of the indication is difficult or impossible and recording is impracticable because of inaccuracies that may occur. The foregoing effect is especially significant when the equilibrium point of the weighing apparatus lies on or near a changeover between two major weight indicia of the digital representation where such vibration results in alteration of two or more digital orders of the numerical value.

A major object of the present invention is to obviate the foregoing difficulty by providing in combination with the conventional weighing apparatus having an electrically operated digital weight indicator and/or recorder, means for preventing changes in the electrical signal that indicates the numerical value of weighment during the readout operation. While this may be accomplished mechanically by locking a movable part of the transducer attached to the weighing apparatus which generates the electrical signal indicating the numerical value of the weighment during the readout interval, the illustrated embodiment contemplates the provision of electrical control signals or interlocks which do not interfere with the mechanical operation of the weighing apparatus, and which when disengaged, permit the indicator or recorder to immediately register the correct numerical value of the weightment in the weigh hopper.

A further object of the invention resides in providing in such a weigh indicating system, a clock circuit connected to provide a controlled periodicity of sensing the electrical signals from the readout device, and a storing means for preventing change in the electrical signal that indicates the numerical value of the weightment during the period of operation of the readout device.

Still another object is to provide a means for preventing operation of the readout device until the weighing apparatus has reached a point of substantially static equilibrium by producing an electrical signal which is connected through a gate circuit which also receives the output signal from the clock circuit and the output signal from the gate circuit is used to control the operation of the indication or recording function. As a further feature, an electrical signal responsive to the printing operation of the readout device is provided during the operation of the print-out device for locking the storing means in its storing function.

Yet another object of the invention is to provide a novel circuit capable of operating either as a sensing circuit or as a storing circuit and means to transfer said circuit from its sensing condition to its storing condition in response to an enabling signal whereby the numerical value sensed at the time the electrical signal is received will be stored until the readout operation is completed.

These and other objects of the invention will become more fully apparent from the claims, and from the description as it proceeds in conjunction with the appended drawings wherein:

FIGURE 1 is a circuit diagram of a weighing and weigh recording system according to the invention;

FIGURE 2 represents the pattern of a binary decimal code known as a reflected type which is adapted for use on a reticule which may be used in the system shown in FIGURE 1; and FIGURE 3 is a circuit diagram of the information sensing and storing unit employed in FIGURE 1.

Referring now to FIGURE 1, the illustrated embodiment of the invention comprises a binary digital weight encoder comprising a plurality of photosensitive cells 1 scanning a binary coded reticule disc 32 mounted on a shaft 33 coupled to the indicator spindle of a weighing scale 34 to provide digital information of the magnitude of an applied load W. The coding on said reticule may be of the type shown in FIGURE 2 herein and also in my copending application Serial No. 217,763 filed August 17, 1962, and thus be capable of so controlling the conduction condition of the four photocells 1.

Referring now to FIGURE 2, the binary code pattern for a decimal digit may be presented in many different forms, for example as a pattern of contacts, a reticule, a magnetized disc, or a perforated disc wherein the "bits" of information are read by contacts or by photoelectric, magnetic or capacitance or pneumatic means respectively which simultaneously scan a line of "bits" of information. If a line of information is read at the changeover between two decimal digits there is the possibility, especially if the code pattern is not stationary relative to the reading means, that slight displacement may be present in the actual changeover point from one binary row to another. This effect may also be aggravated if the reading line is not exactly perpendicular to the code pattern. The disadvantage of this is most pronounced at the changeover from 7 to 8 in the ordinary binary code which is not illustrated. Unless the reading means indicates the change from the binary "units" 4, 2 and 1 to zero exactly at the instant the binary "bit" 8 changes from zero to 8, then an incorrect reading of considerable magnitude may occur, i.e., if the 8 line change from zero to 8 before 4, 2 and 1 change to zero, an error of 7 occurs.

FIGURE 2 shows a so-called reflected binary code pattern which is designed to avoid the aforesaid disadvantage by providing only one "bit" changeover between any adjacent pair of vertical lines. Also it is seen that the apparent fourth order 8 of the code is "reflected" in alternate section. As coded, the "bits" of information in any horizontal line of the illustrated code do not have a constant binary numeral value or weight, but the code is nonetheless comparable to the conventional binary code; and for purposes of the present invention, the illustrated code offers the advantages outlined above.

Each of the four cells 1 is connected to respective circuits 35a, 35b, 35c and 35d for connecting the voltage level indicated on leads 1, 2, 4, and 8 for alternately sensing and storing the information supplied from its cell 1 when the switches 26a and 26b are closed and opened respectively. As will become apparent from the operation of sensing and storing circuits 35 described below in connection with FIGURE 3, when the contacts at switches 26a and 26b open, circuits 35 are no longer able to register changes sensed by photocells 1 and hence circuits 35 function as a storage means by maintaining the condition sensed at the moment switches 26a and 26b open. In their storing conditions, circuits 35 transmit their stored information to a binary decimal decoding circuit 37 controlling the setting of a decimal multi-digit printer 38.

One disadvantage inherent in a general system of this type is that a rapid change in the weight information read by the cells 1, due for example to vibration of the scale 34, makes the printing impracticable. This difficulty is avoided in the following manner.

In order to detect when the scale 34 has reached substantial equilibrium, a patterned or tooth peripheral edge of the disc 32 is scanned by a photocell 39 connected to an "anti-fraud" type circuit 40 which affords a negative output only when the disc is static or moving very slowly. The pattern of alternate transparent and opaque regions is illustrated as the top line of FIGURE 2. Circuit 40 serves as a means responsive to a substantially stable condition of the spindle or scale 34 to produce and enable signal for ultimately causing switch contacts 26a and 26b to open. Circuit 40, which may be of conventional construction, comprises a storage condenser 50 which slowly discharges through resistor 52 and which is rapidly charged through a circuit including diode 54 and coupling capacitor 56; capacitor 56 is discharged through resistor 58.

The output from the circuit 40 is connected to one input of an AND gate circuit 41. The second input of the AND gate is fed from a clock pulse generator circuit 42, such as for example a free running multi-vibrator or intervalometer having a period on the order of one second and giving negative pulses of long duration, for example of 0.8 second duration in each second.

The output from the AND gate 41 is connected to one input of an OR gate circuit 43 having its other input connected to receive a negative signal provided from the printer 38 only when the printer is operative in printing out a record of a weighing operation. The output of the OR gate 43 is fed through an amplifier 44 to the energizing coil of relay 45 controlling the two-pole voltage supply to the sensing and storing circuit 35.

The system operates as follows: When the disc 32 reaches a state of or near equilibrium, the stable condition responsive circuit 40 provides a negative signal to its input of AND gate 41 which also receives a negative signal for 0.8 of each second from the clock circuit 42. Thus, the AND gate 41 supplies a negative output signal for 0.8 of each second to the OR gate 43 when both of its input signals are negative. Unless the printer 38 is actually printing and therefore already giving a negative signal to the OR gate, the negative signal from AND gate 41 operates relay 45 and conditions the circuit 35 to preserve for 0.8 of each second the information sensed in the previous 0.2 second. Thus, when the printer 38 receives a signal input at 46 to initiate a printing cycle the standing information is printed without disturbance due to change in the input to the encoder cells 1. The signal input at 46 may be from a manually operated switch, or from a circuit actuated automatically in response to some other condition in the automatic weighing system.

From the foregoing, it is apparent that a signal from printer 38 to OR gate 43 is effective to maintain relay 45 energized and to hold sensing and storage circuits 35 in their storing function or mode of operation. It should be recognized that equivalent results can be obtained in an alternative system where the information to the printer 38 concerning the weighment, can be intermittently prevented against change during the printing operation by energizing a brake for the disc 32 from the output signal of the OR gate 43, or from the output of the AND gate 41 in the case of a digital indicator instead of a printer.

One example of the sensing and storing circuit 35a through 35d, as may be used for each of the orders, is illustrated in FIGURE 3. In the diagram the photocell 1 is assumed to be of the photo-voltaic type (i.e., one which generates a potential and current when illuminated). The output of the cell 1 feeds a "chopper" stage P comprising a transistor 2 where the base is fed from a pulse generator (not shown) via resistor 3 with a constant train of pulses which are negative for a portion of the time and positive for the remainder of the time. Capacitor 4 charges from the photocell 1 via resistor 7 and the base emitter circuit of transistor 5 when the base of the transistor 2 in positive (i.e., the transistor 2 is non-conducting) and discharges into the amplifier stage Q consisting of the transistor 5, resistors 6, 7, 8 and capacitor 9, when the chopper input is negative.

The amplifier stage Q is a known type of A.C. transistor amplifier and the function of the chopping circuit is to convert the D.C. output from the photocell 1 to an A.C. signal since an A.C. amplifier avoids drift problems which occur when amplifying small D.C. electrical signals. The output from the amplifier stage Q is connected to the network of the capacitors 10 and 13 and diodes 11 and 12 of a voltage doubler stage R which gives a D.C. output across the capacitor 13.

The D.C. output of the doubler stage R is connected to an emitter follower stage S comprising a transistor 14 and a resistor 15 to provide a high impedance input to reduce the current taken from the voltage doubler circuit, and to provide a low impedance output for operating a trigger circuit stage T. The trigger circuit stage T is of the type commonly known as a transistorized Schmidt trigger and comprises transistors 16 and 17 and resistors 18, 19, 20, 21 and 22. The operation of the trigger circuit is such that when the output at the emitter of transistor 14 is above a certain potential (measured negatively to the zero line) then the output voltage at the collector of transistor 17 will be a negative potential nearly equal to that of the negative supply, whereas when the emitter voltage of transistor 14 is below this given level transistor 17 conducts and the potential of its collector drops to nearly zero potential.

The function of the foregoing circuit is to produce a negative output voltage at the collector of transistor 17 when the light level on the photocell 1 exceeds a certain level, which would normally be arranged to occur when the photocell is half illuminated through the reticule disc 32. Resistors 23 and 24 with a diode 25 comprises an electrical locking circuit stage U such that when a positive feed-back connection is made from the collector circuit of transistor 17 to the base circuit of transistor 14 then the Schmidt trigger circuit and emitter follower are converted to form a bistable circuit.

The operation of the storage system consisting of the trigger and locking stages T and U is controlled by the double pole switch 26a, 26b in the following manner:

When the relay switch 45 is energized, it removes via its contact pair 26a and 26b the negative voltage supplied to the amplifier stage Q to render the latter inoperative. Simultaneously the positive potential applied to the lower end of resistor 24 through the other switch contact pair 26b is removed. The values of the resistors 23 and 24 are proportioned so that when the switch is closed, diode 25 is biased to the non-conducting state whatever the potential at the collector of the transistor 17. Thus, when the relay switch is opened, if the collector of transistor 17 is zero (i.e., with the photocell 1 dark) the diode 25 is still non-conducting so that the output from transistor 17 remains in the zero potential condition irrespective of further illumination changes on the photocell since the amplifier stage Q is inoperative. Alternatively, if the switch is opened while the transistor 17 is non-conducting (i.e., with the photocell 1 illuminated), the potential applied to the diode 25 via resistor 23 from the collector of transistor 17 causes the diode 25 to conduct to hold the base of the emitter follower 14 sufficiently negative to hold the Schmidt trigger circuit T in condition with the collector of transistor 16 at zero potential and transistor 17 at negative potential, so that the output is held in the condition equivalent to the cell 1 being illuminated irrespective of further changes in illumination. When the contacts 26a and 26b are closed the circuit is operative to sense a new state of the cell 1 ready to store this information when the switches are next opened.

From the foregoing it is apparent that the system as described above enables the photocell sensing circuits to be locked into their storage mode of operation during a read-out or printing operation and thereafter revert to their sensing mode of operation and transfer immediately to sense any new position of the reticule and may have occurred during the interval required for the read-out or printing operation. There is, by virtue of responding to the pattern of standing voltages from the photocell circuits, no inaccuracy which would result from the loss pulses which would be present if a pulse counting system were used to capture the data indicative of the position of shaft 33 of the weighing apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A weighing apparatus comprising weighing means, encoding means responsive to said weighing means to furnish on a plurality of output leads a pattern of simultaneous voltage levels indicative of the magnitude of a load on said weighing means, circuit means connected to the output leads of said encoding means and being capable of alternately sensing and storing said pattern of voltage levels, means responsive to a substantially stable condition of said weighing means for producing an enabling signal, means including an AND gate circuit connected to receive said enabling signal for transferring said sensing and storing circuit means from its sensing condition to its storing condition, and a digital read-out device connected to the output of said sensing and storing means and responsive to the voltage levels held by said sensing and storing means only when said last mentioned means is in its storing condition.

2. Weighing apparatus as defined in claim 1 further comprising a free running multivibrator, and means connecting the output signal of said multivibrator to an input terminal of said AND gate to pass said enabling signal to said sensing and storing means.

3. Weighing apparatus as defined in claim 2 further comprising an OR gate circuit having two input terminals and an output terminal, means connecting said enabling signal to one of said OR gate input terminals, means connecting a signal indicative of operation of said read-out device to a second of said OR gate input terminals, and means connecting the signal on the output terminal of said OR gate to control the condition of operation of said sensing and storing circuit means.

4. Weighing apparatus as defined in claim 1 wherein the means responsive to a substantially stable condition of said weighing means comprises: a reticule mounted for rotation in response to the loading of said weighing means, said reticule having a periphery with alternate adjacent regions being transparent and opaque, a photocell disposed to be illuminated through said alternate regions; and a circuit connected to the output of said photocell having a storage condenser providing an output voltage indicating a substantially stationary condition of said reticule, a coupling capacitor and diode through which said storage condenser is charged.

5. Weighing apparatus according to claim 4, further comprising a printing type read-out device and a further gate circuit connected between said movement responsive means and said printing type read-out device, said gate circuit being responsive to the printing operation of said device for producing an electric signal to lock said sensing and storing circuit means in its storing condition throughout the printing operation of said read-out device.

6. Weighing apparatus according to claim 5, further comprising a clock circuit connected to cyclically block and unblock said enabling signal from said stable condition responsive means, said clock circuit providing its unblocking function for a longer time period than its consecutive blocking function for each cycle of the clock circuit operation.

7. A weighing apparatus comprising weighing means, encoding means responsive to said weighing means to furnish on a plurality of output leads a pattern of simultaneous voltage levels indicative of the magnitude of a load on said weighing means, circuit means connected to the output leads of said encoding means and being capable of alternately sensing and storing said pattern of voltage levels, a clock circuit connected to provide a signal to said sensing and storing circuit means for repetitively conditioning said sensing and storing means alternately in its sensing and storing conditions for predetermined time intervals, and a digital read-out device responsive to the voltage levels held by said storing circuit means in the storing condition of the latter.

8. Weighing apparatus according to claim 7, comprising circuit means responsive to movement in said weighing means to prevent operation of said digital read-out device until said weighing means is substantially in static equilibrium.

9. Weighing apparatus according to claim 8, comprising an OR gate circuit having one input terminal connected to receive the combined output signal of said movement responsive means and said clock circuit, an output terminal connected to said sensing and storing circuit means, and a second input terminal connected to be responsive to a printing operation of said digital read-out device to prevent a change in operation of said sensing and storing means during operation of said read-out device.

10. A weighing apparatus comprising:
(a) a weighing scale,
(b) an encoding means controlled by the movement of said scale to produce standing electrical signals indicative of the magnitude of the load being weighed on said scale,
(c) means connected to said encoding means for sensing and storing said signals,
(d) a circuit means responsive to movement of said scale below a predetermined rate,
(e) an independent clock pulse generator for controlling the alternate storing and sensing of said encoding means,
(f) an AND gate connected to and controlled by said movement responsive circuit means and said clock pulse generator,
(g) a readout device connected to said sensing and storing means controlled by said signals,
(h) an OR gate connected to and controlled by said AND gate and the operation of said readout device, and
(i) a switching means connected to and controlled by said OR gate to alternately disconnect and connect said sensing and storing means to said readout device when and only when said weighing scale is moving below said predetermined rate and said readout device is not operating.

11. A weighing apparatus according to claim 10 wherein said readout device includes a binary decimal decoder.

12. A weighing apparatus according to claim 11 wherein said readout device includes a printer.

References Cited by the Examiner

UNITED STATES PATENTS

| | | | |
|---|---|---|---|
| 2,812,171 | 11/1957 | Charbonnier et al. | 177—16 |
| 3,039,686 | 6/1962 | Bell et al. | |
| 3,042,128 | 7/1962 | Bell et al. | 177—210 |
| 3,105,940 | 10/1963 | Bell et al. | |

LOUIS J. CAPOZI, *Primary Examiner.*